US006864485B2

(12) United States Patent
Kahn et al.

(10) Patent No.: US 6,864,485 B2
(45) Date of Patent: Mar. 8, 2005

(54) ION OPTICS WITH SHALLOW DISHED GRIDS

(75) Inventors: James R. Kahn, Ft. Collins, CO (US); Cheryl A. Phillips, deceased, late of Loveland, CO (US); by Rhonda J. Parker, legal representative, Loveland, CO (US); Harold R. Kaufman, LaPorte, CO (US)

(73) Assignee: Kaufman & Robinson, Inc., Ft. Collins, CO (US)

( * ) Notice: Subject to any disclaimer, the term of this patent is extended or adjusted under 35 U.S.C. 154(b) by 0 days.

(21) Appl. No.: 10/001,165

(22) Filed: Dec. 4, 2001

(65) Prior Publication Data

US 2002/0074508 A1 Jun. 20, 2002

Related U.S. Application Data

(60) Provisional application No. 60/255,482, filed on Dec. 14, 2000.

(51) Int. Cl.[7] .............................. G01K 1/08; H01J 9/12; H01J 9/04

(52) U.S. Cl. .............................. 250/396 R; 250/396 ML; 445/47; 445/49; 313/360.1

(58) Field of Search .............................. 250/396 R, 396 ML; 445/47, 49; 313/360.1; 216/52, 56; 60/202

(56) References Cited

U.S. PATENT DOCUMENTS 3,852,633 A * 12/1974 Hunter .............................. 313/411
3,947,933 A * 4/1976 Banks .............................. 445/47
4,873,467 A * 10/1989 Kaufman et al. .............................. 313/360.1
5,465,023 A * 11/1995 Garner .............................. 313/293
5,551,904 A * 9/1996 Hedges et al. .............................. 445/47
5,924,277 A * 7/1999 Beattie et al. .............................. 60/202
5,934,965 A * 8/1999 Beattie .............................. 445/49

* cited by examiner

*Primary Examiner*—Jack Berman
*Assistant Examiner*—Kalimah Fernandez
(74) *Attorney, Agent, or Firm*—Dean P. Edmundson

(57) ABSTRACT

In accordance with one specific embodiment of the present invention, the ion optics for use with an ion source have a plurality of electrically conductive grids that are mutually spaced apart and have mutually aligned respective pluralities of apertures through which ions may be accelerated and wherein each grid has an integral peripheral portion. A plurality of moment means are applied to a circumferentially distributed plurality of locations on the peripheral portion of each grid, which is initially flat, thereby establishing an annular segment of a cone as the approximate shape for that peripheral portion and a segment of a sphere as the approximate dished shape for the grid as a whole. The plurality of grids have conformal shapes in that the direction of deformation and the approximate spherical radii are the same. This elastic deformation during installation avoids any need for any permanent or inelastic deformation during fabrication, as well as controlling the excessive thermal displacements and accompanying performance changes to which flat grids are prone.

10 Claims, 6 Drawing Sheets

ION OPTICS WITH SHALLOW DISHED GRIDS

CROSS-REFERENCE TO RELATED APPLICATIONS

This application is based upon and claims the benefit of Provisional Application No. 60/255,482 filed Dec. 14, 2000. U.S. Pat. No. 6,246,162, Kahn, et al., is also related to the present invention.

FIELD OF INVENTION

This invention relates generally to gridded ion sources, and more particularly to the design of ion optics for such ion sources. This invention can find application in a variety of thin film applications such as etching, sputter deposition, or the property modification of deposited films. It can also find application in electric space propulsion.

BACKGROUND ART

Gridded ion sources are described in an article by Kaufman, et al., in the *AIAA Journal*, Vol. 20 (1982), beginning on page 745, which is incorporated herein by reference. The ion sources described therein use a direct-current electrical discharge to generate ions. It is also possible to use a radiofrequency electrical discharge to generate ions, as shown by U.S. Pat. No. 5,274,306—Kaufman et al.

The ion optics for gridded ion sources incorporate closely spaced grids with mutually aligned pluralities of apertures, through which the ions are electrostatically accelerated. A high current density of these accelerated ions at the desired operating voltages is beneficial in that it corresponds to a high process rate in an industrial application and a high thrust in a space electric-propulsion application. The maximum current density of the accelerated ions varies inversely as the square of the distance between the grids, so that obtaining a high current density requires closely spaced grids.

A close grid spacing can be obtained easily for small ion beams with small ion current capacities, but becomes progressively more difficult as the beam diameter (assuming a circular beam) becomes larger. To include the effect of beam diameter, d, in the difficulty of maintaining a given nominal grid spacing, L, it has been found useful to use a span-to-gap ratio, d/L, as discussed in the aforesaid article by Kaufman, et al. As also described in the aforesaid article, a large span-to-gap ratio, hence a large ion beam current, can be obtained by using grids having a matching dished shape. For dished grids, the grids approximate matching segments of a sphere instead of the more obvious flat shapes used in most early ion sources. This beneficial effect of dished grids has been the motivation for development of the complicated fabrication techniques required for these grids, as described in U.S. Pat. No. 3,864,797—Banks and U.S. Pat. No. 3,914,969—Banks.

While dished grids have permitted larger span-to-gap ratios, they also have a substantial degree of curvature. This curvature can be used in some industrial applications to generate either focused or defocused ion beams, as described in a brochure by Kaufman, et al., entitled *Characteristics, Capabilities, and Applications of Broad-Beam Sources*, Commonwealth Scientific Corporation, Alexandria, Va. (1987). If a more collimated ion beam is desired, the curvature used in conventional dished grids presents a problem in that the grids must first be dished, then the apertures in the two grids must displaced relative to each other to obtain a more parallel beam. The trajectory deflection obtained by aperture displacement is also described in the aforesaid brochure. This displacement is obtained, however, with a reduction in maximum ion beam current.

The use of conventional dished grids in ion optics thus permits the use of a large span-to-gap ratio (a small spacing for a given beam diameter), but requires the expense of dishing the grids and at the same time makes it difficult to obtain a nearly collimated ion beam.

SUMMARY OF INVENTION

In light of the foregoing, it is an overall general object of the invention to provide an improved ion optics design that permits the use of large span-to-gap ratios utilizing grids having a shallow dished shape when installed in the ion optics.

Another object of the present invention is to provide an ion optics design using shallow dished grids in which a nearly collimated ion beam is generated without the simultaneous use of displaced apertures in the two grids, which in turn would result in a reduction in ion beam current capacity.

A further object of the present invention is to provide an ion optics design in which the grids need not be dished prior to their installation in the ion optics.

Yet a further object of the present invention is to provide an ion optics design in which the grids are dished at the time of installation in the ion optics and by the manner in which they are installed in those ion optics.

In accordance with one specific embodiment of the present invention, the ion optics for use with an ion source have a plurality of electrically conductive grids that are mutually spaced apart and have mutually aligned respective pluralities of apertures through which ions may be accelerated and wherein each grid has an integral peripheral portion. A plurality of moment means are applied to a circumferentially distributed plurality of locations on the peripheral portion of each grid, which is initially flat, thereby establishing an annular segment of a cone as the approximate shape for that peripheral portion and a segment of a sphere as the approximate dished shape for the grid as a whole. The plurality of grids have conformal shapes in that the direction of deformation and the approximate spherical radii are the same. This elastic deformation during installation avoids any need for any permanent or inelastic deformation during fabrication, as well as controlling the excessive thermal warping to which flat grids are prone.

This invention is well suited to ion-optics grids of circular shape, which is the most common shape for such grids. It is also well suited for grids of a rectangular or elliptical shape, or other shape where the thermal heating of the grid has a symmetry approximately matching that of the grid.

BRIEF DESCRIPTION OF FIGURES

Features of the present invention which are believed to be patentable are set forth with particularity in the appended claims. The organization and manner of operation of the invention, together with further objectives and advantages thereof, may be understood by reference to the following descriptions of specific embodiments thereof taken in connection with the accompanying drawings in which:

It may be noted that the aforesaid schematic cross-sectional views represent the surfaces in the plane of the section while avoiding the clutter which would result were there also a showing of the background edges and surfaces of the overall assemblies.

DESCRIPTION OF PRIOR ART

Figure 1:
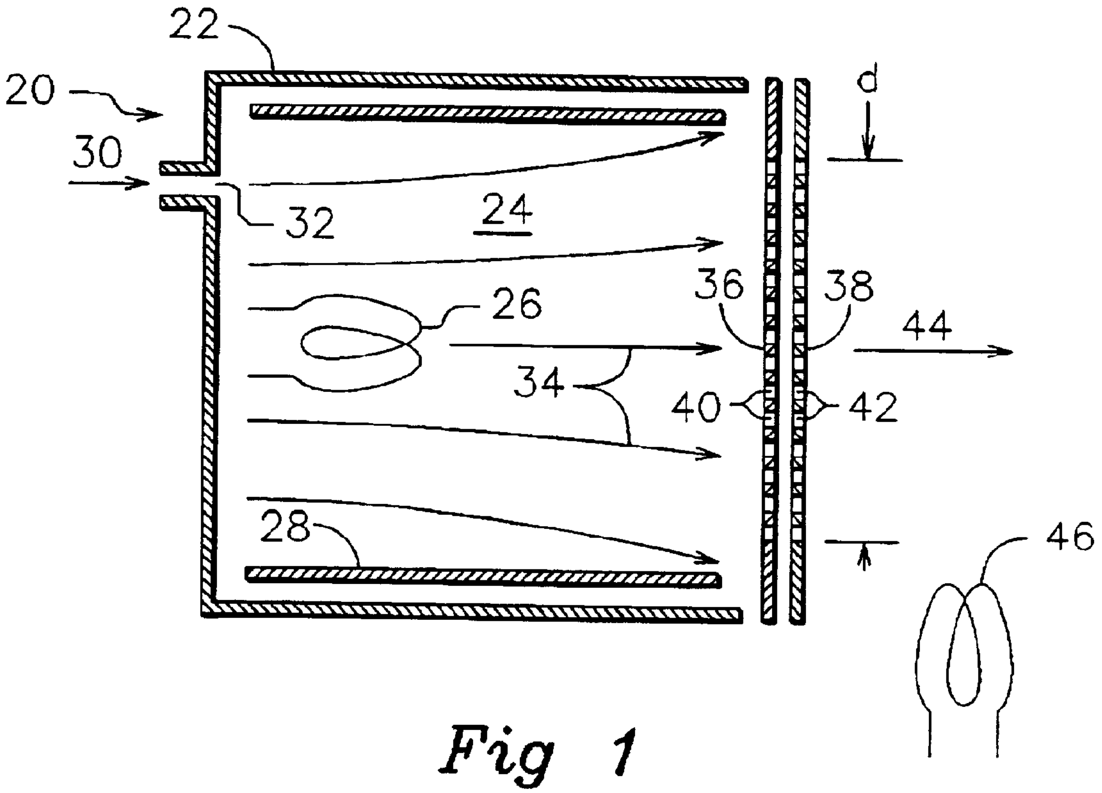
Fig 1 (PRIOR ART)
FIG. 1 is a schematic cross-sectional view of a prior-art gridded ion source.

Referring to FIG. 1, there is shown a schematic cross section of a prior-art gridded ion source 20. There is an outer enclosure 22 that encloses a volume 24. Within this volume is an electron emitting cathode 26 and an annular anode 28. An ionizable gas 30 is admitted to volume 24 through an opening 32. Electrons emitted from cathode 26 are contained by magnetic field 34 and reach anode 28 only after having ionizing collisions with gas atoms or molecules. The electrically conductive gas of ions and electrons that fills most of volume 24 constitutes a plasma. Some of the ions in this plasma reach the screen grid 36 and the accelerator grid 38, which together with any necessary supporting structure form the ion optics. The ions are formed into beamlets by apertures 40 in screen grid 36 and are extracted by the negative potential of accelerator grid 38 and pass through apertures 42 therein. The apertures 40 and 42 in the screen and accelerator grids are usually, but not always, circular. The ions continue after passing through the ion optics to form ion beam 44. The ion beam is charge- and current-neutralized by electrons emitted from the electron emitting neutralizer 46.

The potential difference between the electron emitting cathode 26 and the anode 28 is typically 30 to 40 volts. The ions are formed at approximately the potential of the anode. The energy of the accelerated ions can be adjusted by varying the anode potential relative to ground, which is the potential of the surrounding vacuum chamber in an industrial application and the potential of the surrounding space plasma in an electric space propulsion application. Electrically conductive screen grid 36 is either at cathode potential or allowed to electrically float. Enclosure 22, which is exposed to the internal plasma as shown in FIG. 1, will also be at either cathode potential or allowed to electrically float. Electrically conductive accelerator grid 38 is operated at a negative potential at least sufficient to keep the electrons from the neutralizer 46 from flowing backwards through the ion optics. Because of the potential difference between screen grid 36 and accelerator grid 38, it is necessary that the two grids are spaced apart from each other and do not touch. The neutralizer is operated at or near ground potential.

Figure 2:
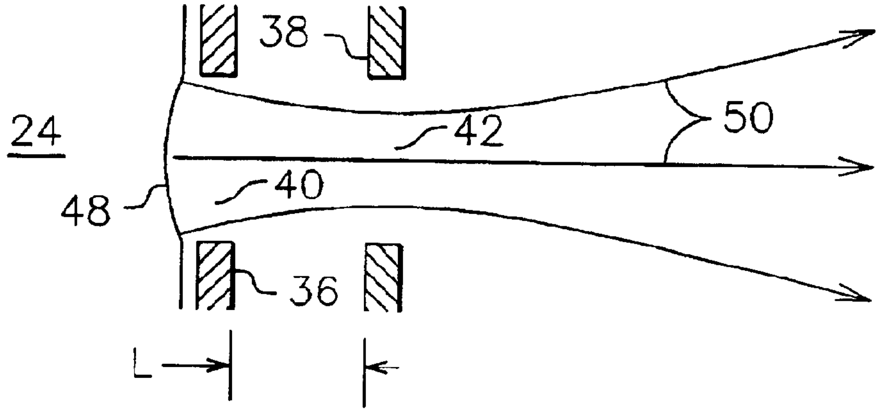
Fig. 2 (PRIOR ART)
FIG. 2 is an enlarged schematic cross-sectional view of a matching pair of ion-optics apertures in the prior art ion source of FIG. 1.

Referring to FIG. 2, there is shown an enlarged schematic cross-sectional view of a matching pair of ion-optics apertures in the prior art ion source of FIG. 1. The boundary between the plasma filling volume 24 and the ion optics is the plasma sheath 48. To the left of the plasma sheath in FIG. 2 is a quasineutral plasma with approximately equal densities of electrons and ions. The increasingly negative potentials to the right of this sheath reflect electrons and leave essentially only the ions that are being accelerated. Ideally, the screen aperture 40 and the accelerator aperture 42 are aligned so that the ion beamlet formed by aperture 40 in the screen grid 36 and indicated by the central and outer ion trajectories 50 passes through aperture 42 in the accelerator grid 38 without striking that grid. There are additional alignment considerations for grids 36 and 38 and apertures 40 and 42 therein that are discussed in U.S. Pat. No. 6,246,162, Kahn, et al.

The current capacity of the ion optics shown in FIG. 1 is approximately given by Child's law, which was derived for the acceleration of charged particles between parallel surfaces. For a circular ion beam of diameter d (see FIG. 1) and a grid spacing L (see FIG. 2), the Child's law current J is given by Equation (9) in the aforesaid article by Kaufman, et al., in the *AIAA Journal.*

$$J=(\pi\epsilon_o/9)(2q/m)^{1/2}(V^{3/2}d^2/L^2) \qquad (1)$$

In equation (1), $\epsilon_o$ is the permittivity of free space, q/m is the charge-to-mass ratio of the accelerated ions, V is the voltage between the two grids, d is the beam diameter and L is the spacing between the grids. The units of these quantities are SI (mks). Note that, with other parameters held constant, the ion current capacity varies as $(d/L)^2$. To obtain high ion beam currents, and the correspondingly high process rates desired in industrial applications and the correspondingly high thrusts desired in electric space propulsion, it is necessary to use L<<d. The use of a small value of grid spacing, L, can be limited by the thermal displacement of grids during operation.

Figure 3:
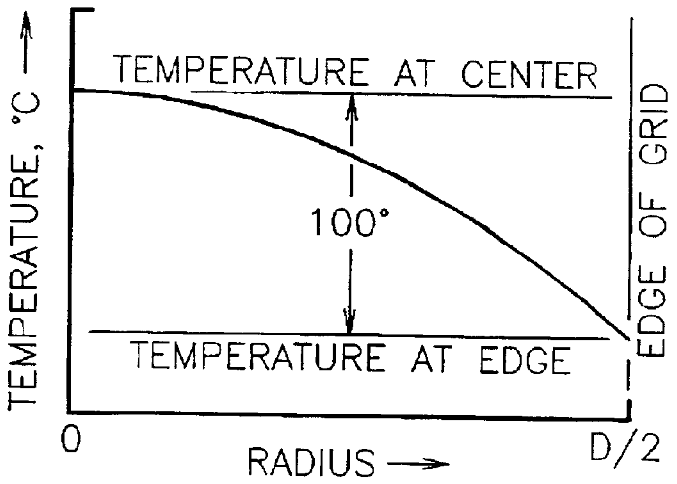
Fig. 3 (PRIOR ART)
FIG. 3 shows a typical variation of grid temperature with grid radius.

As described in a chapter by Kaufman beginning on page 265 of *Advances in Electronics and Electron Physics*, Vol. 36 (L. Marton, ed.), Academic Press, New York, 1974, the radial variation in grid temperature during operation is 100° C., or more for grids made of molybdenum, which is a frequent choice for grid material. A radial variation of 100° C. is shown in FIG. 3. Assuming a molybdenum grid that is thin enough to bend easily, a temperature distribution similar to that of FIG. 3 would result in the center of the grid expanding more than the edge and being displaced out of the initial flat plane in one direction or the other. This displacement is shown by the dashed lines 52 in FIG. 4, with the maximum displacement reaching a value of H at the center of the grid equal to about 1/100 of the grid diameter D. This thermal grid displacement is shown approximately to scale in FIG. 4 for the temperature distribution of FIG. 3 and the thermal expansion of molybdenum. It should be recognized that, while the center of the thermally distorted grid is shown displaced to the right, an initially flat grid can be displaced in either direction. Also, although the grid is identified as the screen grid 36 of FIG. 1, a similar radial temperature variation, and hence a similar thermal distortion, would occur for the accelerator grid 38.

Figure 4:
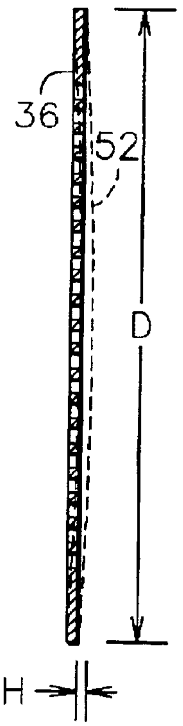
Fig. 4 (PRIOR ART)
FIG. 4 is a schematic cross section of the prior-art flat screen grid shown in FIG. 1. The dashed lines show the shape that results from a radial temperature distribution similar to that shown in FIG. 3.

It should be pointed out that the thermal expansion due to the general temperature, as opposed to the temperature variation within a grid, is much smaller than shown in FIG. 4. For example, a general temperature increase of 300° C. would result in a change in diameter D of the grid shown in FIG. 4 of only about 0.1 mm, which would be negligible compared to the effect of the 100° C. radial temperature difference shown by the dashed line. Also, in the discussion in connection with FIG. 4, it was assumed that the grid was not constrained and was thin enough to bend easily. If the grid is thick enough that the bending shown in FIG. 4 results in stresses above the elastic limit, permanent distortion can result from the radial temperature difference. Permanent distortion can also result if the grid is mechanically constrained to keep it from reaching the dished shape shown by the dashed line.

Figure 5:
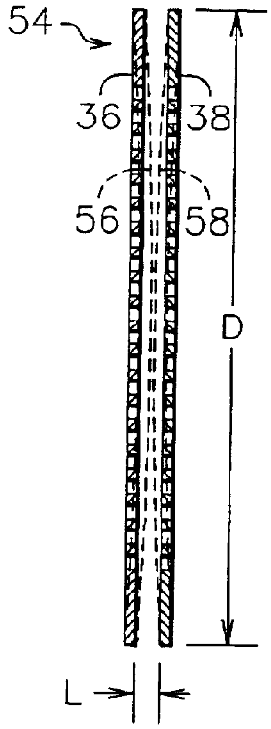
Fig. 5 (PRIOR ART)
FIG. 5 is a schematic cross section of the prior-art ion optics of FIG. 1. The dashed lines show the shapes that may result from radial temperature distributions similar to that shown in FIG. 3.

Referring to FIG. 5, ion optics 54 is indicated in which the centers of the initially flat screen grid 36 and accelerator grid 38 are thermally displaced toward each other. If the two grids are to avoid touching and electrically shorting in this worst-case thermal displacement, the nominal spacing between grids L must equal or exceed twice the displacement of a single grid H. The minimum permissible value of L would then be expected to be about 1/50 of D. This analysis uses the grid diameter, D, instead of the beam diameter, d. Experimental investigations have given an approximate minimum spacing of 1/60 of the beam diameter. Inasmuch as the beam diameter, d, does not differ greatly from the grid diameter, D, the substantial agreement between the theoretical and experimental values of minimum nominal spacings indicates that thermal displacement, as indicated in FIGS. 4 and 5, is primarily responsible for the minimum permissible spacings of flat molybdenum grids in ion optics.

It should be noted that the displacement shown by the dashed lines in FIG. 5 is a worst case with the grids displaced toward each other. In such a case the grids must be initially spaced far enough apart to avoid contact after the displacement. The grids may also be thermally displaced away from each other, which would result in a large reduction in ion current capacity, as indicated by equation (1). The two grids may also be thermally displaced in the same direction, which would result in a displacement in the direction of the ion beam. Although the worst-case displacement shown in FIG. 5 is easily understood, it is not the only possible adverse configuration for thermal displacement.

Figure 6:
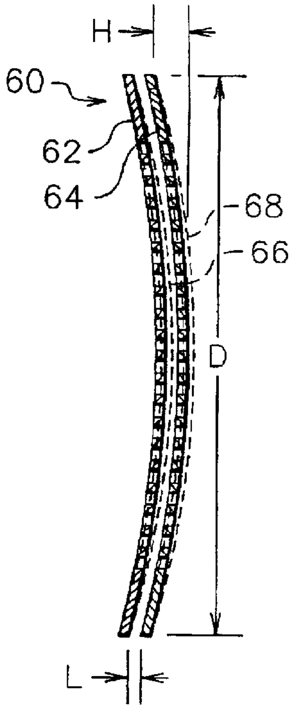
Fig. 6 (PRIOR ART)
FIG. 6 is a schematic cross section a prior-art ion optics which performs an ion optics function similar to that of the flat screen and accelerator grids in FIG. 1 but utilizes dished screen and accelerator grids.

Referring to FIG. 6, ion optics 60 is indicated in which the screen grid 62 and the accelerator grid 64 are initially dished into shapes that approximate segments of spheres. During operation, a radial temperature difference similar to that shown in FIG. 3 results in the thermal displacements shown by dashed lines 66 and 68. Because the grids start from a dished shape, the thermal displacement is always toward an increase in dishing depth, so the direction of this displacement is predictable. Further, the radial temperature differences tend to be similar for two closely spaced grids, so the relative motion of the two grids is minimized and the local spacing remains nearly constant during the thermal displacement. As described in the aforesaid article by Kaufman, et al., in the *AIAA Journal*, the use of dished molybdenum grids similar in shape to those shown in FIG. 6 permits the use of a nominal grid spacing L that is only 1/600 of the beam diameter d. The use of a dished grid shape has thus been a major advance in the design of ion optics with small spacings and high beam current capacities.

Figure 7:
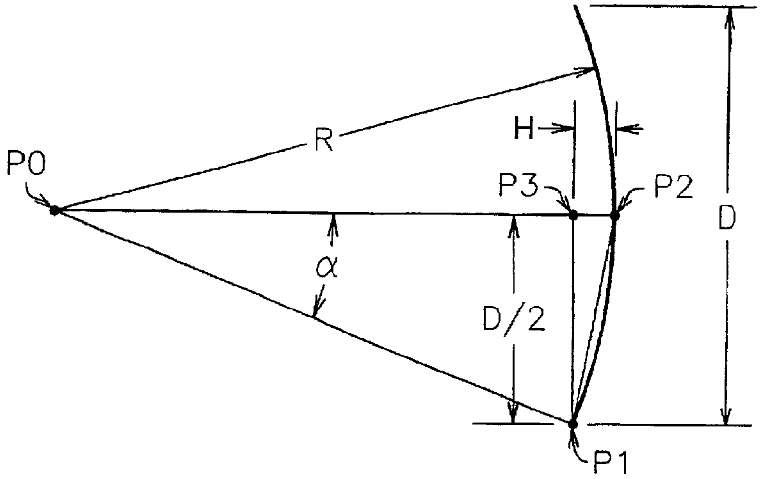
Fig. 7 (PRIOR ART)
FIG. 7 is a geometric figure illustrating the circular-arc approximation for a prior-art dished grid showing the depth of dishing.

To further understand the dishing process and its limitations, it is helpful to use the circular-arc approximation of a dished grid. A circular arc, representing the cross section of a dished grid, is shown in FIG. 7. The grid as a whole has the shape of a segment of a sphere. The arc is defined by the origin of the arc P0 and the radius of the arc R. The half-angle of this arc is α. The two sides of the triangle adjacent to angle α both have a length equal to the radius R, making the triangle defined by the points P0, P1, and P2 an isosceles triangle. The other two angles of this triangle are thus equal to $(\pi/2)-(\alpha/2)$.

Still referring to FIG. 7, the triangle defined by points P1, P2, and P3, is seen to have one angle of $\pi/2$, one angle of $(\pi/2)-(\alpha/2)$, and one angle of $\alpha/2$. The angle a can be defined in terms of the dishing depth H and the grid diameter D as $$\alpha=2\tan^{-1}(2H/D) \tag{2}$$

Because the compression of thin material results in compression wrinkles, the forming of a dished shape from thin sheet must be done entirely by stretching beyond the elastic limit. The amount of permanent or inelastic deformation Δ required to form the dished shape is the difference between the arc length and the diameter, $$\Delta=2\alpha R-D, \tag{3}$$

where the radius R is given by $$R=D/(2\sin\alpha). \tag{4}$$

Equations (2), (3), and (4) can be used to relate the relative dishing depth H/D to the inelastic deformation ratio Δ/D required to form the dished shape from an initial flat shape. Because of the trigonometric functions, the solution of these equations for a given H/D or Δ/D is an iterative one, but it is easily accomplished.

Figure 8:
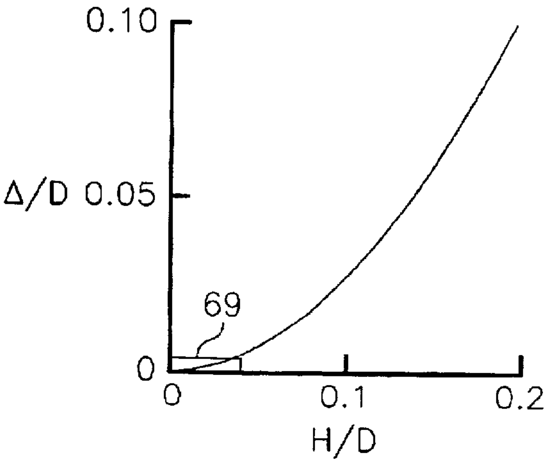
Fig. 8 (PRIOR ART)
FIG. 8 is the prior-art circular-arc variation of inelastic deformation ratio, Δ/D, with relative depth of dishing, H/D.

The variation of inelastic deformation ratio Δ/D with the relative dishing depth H/D is shown in FIG. 8. The first dished grids were made for thrusters used in space electric propulsion and are described in the aforesaid chapter by Kaufman beginning on page 265 of *Advances in Electronics and Electron Physics*. The relative dishing depth used in these grids was about 0.17. Dished grids used in industrial applications are described in an article by Kaufman, et al., beginning on page 98 of *Nuclear Instruments and Methods in Physics Research*, Vol. B37/38, 1989. The relative dishing depth of these grids was about 0.1.

The use of dished grids can be convenient when focused or defocused ion beams are desired, but can present a problem when a collimated ion beam is desired. As described by Kaufman, et al., in an article beginning on page 179 of the *Journal of Vacuum Science and Technology*, Vol.

16, 1979, it is possible to deflect a beamlet (that portion of the ion beam passing through a single pair of apertures) by offsetting an accelerator-grid aperture relative to a screen-grid aperture in a direction parallel to the local plane of the grid. In this manner, the accelerator-grid apertures may be systematically displaced relative to the screen-grid apertures to generate an approximately collimated ion beam when using dished grids. In addition to being complicated and often requiring several iterations to obtain approximate collimation, the offsetting of apertures reduces the ion current capacity of the grids.

Figure 9:
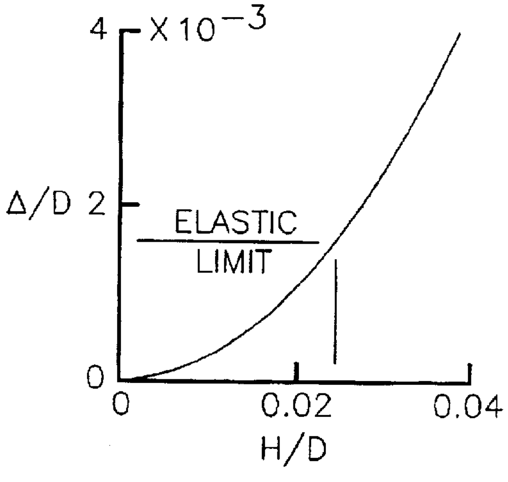
Fig. 9 (PRIOR ART)
FIG. 9 is an enlargement of a portion of FIG. 8.

More recent attempts to reduce the relative dishing depth of grids have been successful to values of about 0.07–0.08. The nature of the problems encountered when attempting further reductions in relative dishing depth can be explained with the help of FIG. 8 and FIG. 9, which is an enlarged view of the portion of FIG. 8 enclosed within rectangle 69. The difference between a relative dishing depth H/D of 0.09 and 0.10 in FIG. 8 corresponds to a difference in deformation ratio Δ/D of about 0.005. For a difference in relative dishing depth of 0.04 and 0.05, the difference in deformation drops to only 0.0024. In other words, fabricating dished grids with a reproducible dishing depth requires greater precision in the inelastic deformation as the relative dishing depth becomes smaller.

Another problem is encountered as the relative dishing depth drops to about 0.024. The maximum elastic deformation ratio, the yield stress divided by the modulus of elasticity, for molybdenum is about $1.6 \times 10^{-3}$. Grids fabricated with a relative dishing depth of about 0.024 required an inelastic deformation ratio of about $1.6 \times 10^{-3}$ and were found to be bistable. They would remain dished if untouched, but would become and stay flat when pushed flat. This bistable behavior could take place without any additional inelastic deformation.

In summary, the fabrication and use of prior-art grids with a small relative dishing depth, which are commonly called shallow dished grids, requires a dishing operation that is both difficult and expensive because of the close tolerances required for the inelastic deformation to obtain reproducible dishing depths. In addition, at very shallow depths (0.024 for molybdenum), the dished shape obtained can be bistable, hence subject to even greater uncertainty in dishing depth.

DESCRIPTION OF THE PREFERRED EMBODIMENTS

Figure 10:
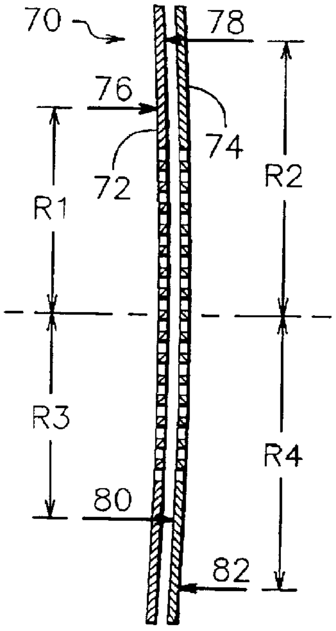
FIG. 10 is a schematic cross section of an ion optics constructed in accord with the present invention.

Referring to FIG. 10, there is shown ion optics 70 constructed in accordance with an embodiment of the present invention. Ion optics 70 is comprised of screen grid 72 and accelerator grid 74, with both grids fabricated flat prior to assembly into the ion optics. When assembled into ion optics 70, a first plurality of moments, indicated schematically by equal magnitude, but oppositely directed, forces 76 and 78 at the respective radii of R1 and R2, are applied at a plurality of circumferentially distributed locations on the peripheral portion of screen grid 72. This first plurality of moments form the peripheral portion of screen grid 72 into the approximate shape of an annular segment of a cone and form the screen grid as a whole into the approximate shape of a segment of a sphere.

Figure 11A:
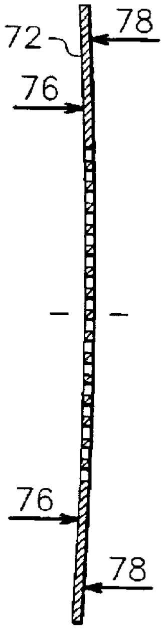
FIG. 11*a* is a schematic cross section of the flat screen grid of FIG. 10 formed into a dished shape by a plurality of moments applied to its peripheral portion in accord with the present invention.
Figure 11B:
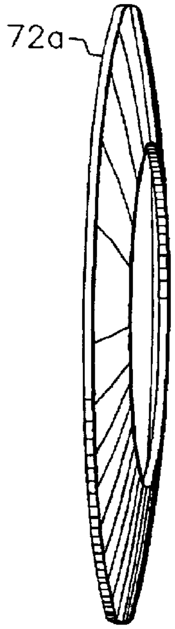
FIG. 11*b* is a perspective view of the peripheral portion of the screen grid shown in FIG. 11*a;*
Figure 11C:
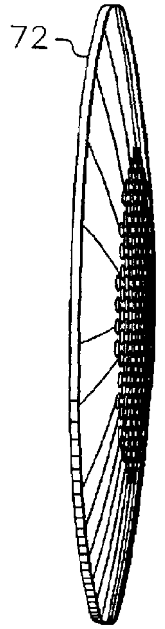
FIG. 11*c* is a perspective view of the entire screen grid shown in FIG. 11*a;*

The shape of screen grid 72 and the moments due to forces 76 and 78 that produce that shape can be made clearer by referring to FIG. 11*a*, in which accelerator grid 74 and its associated moments are omitted. The plurality of moments due to forces 76 and 78 are indicated schematically with a single pair of forces in FIG. 10, but are indicated with a pair of opposing moments on opposite sides of screen grid 72 in FIG. 11*a*. There are additional opposing pairs of moments distributed around the peripheral portion of screen grid 72, located outside of the plane of the section shown in FIG. 11*a*. This plurality of moments sum to zero net force and zero net moment on the screen grid as a whole, but form the peripheral portion of screen grid 72 into the approximate shape of an annular segment of a cone, as shown in FIG. 11*b*. Screen grid 72 as a whole is formed by the same plurality of moments into the approximate shape of a segment of a sphere, as shown in FIG. 11*c*. Both of these shapes are only approximate and other closely related shapes such as parabolic or elliptic could result from different variations in grid thickness and details of the application of the plurality of moments to the peripheral portion of the grid, and would also satisfy the spirit and scope of the present invention.

Again referring to FIG. 10, a second plurality of moments, indicated schematically by equal magnitude, but oppositely directed, forces 80 and 82 at-the respective radii of R3 and R4, are applied at plurality of circumferentially distributed locations on the peripheral portion of accelerator grid 74. This second plurality of moments form the peripheral portion of accelerator grid 74 into the approximate shape of an annular segment of a cone and form the accelerator grid as a whole into the approximate shape of a segment of a sphere, in a manner similar to that described for screen grid 72 in connection with FIGS. 11*a*, 11*b*, and 11*c*. The schematic representation of moments in FIG. 10 is thus a condensed representation, with the moment of forces 76 and 78 representing one circumferentially distributed plurality of moments and forces 80 and 82 representing another such plurality.

With the first and second plurality of moments, grids 72 and 74, which are initially flat, are formed elastically into matching shallow dished shapes. This elastic deformation during installation avoids any need for permanent deformation during fabrication, as well as the excessive unpredictable thermal warping and corresponding unpredictable performance to which flat grids are prone. No inelastic deformation is required to make these dished shapes.

Figure 12:
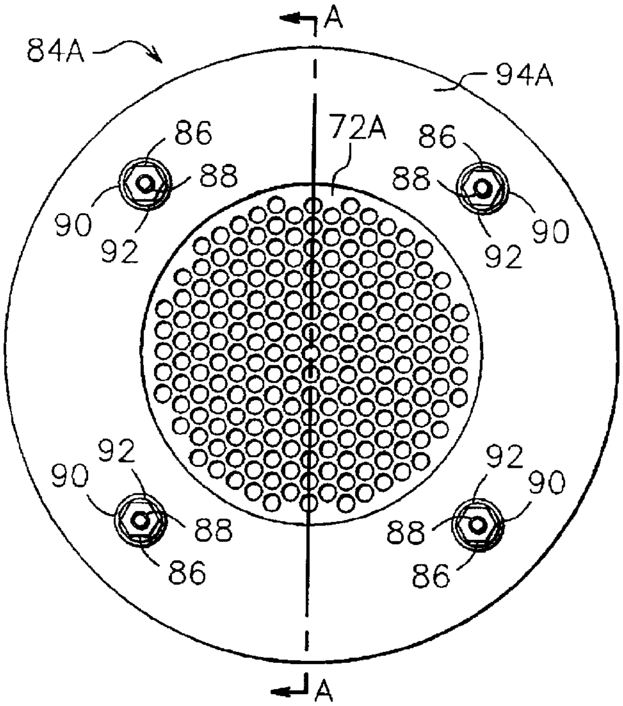
FIG. 12 is an ion optics constructed in accord with one embodiment of the present invention and having more construction details than the ion optics shown in FIG. 10.
Figure 13:
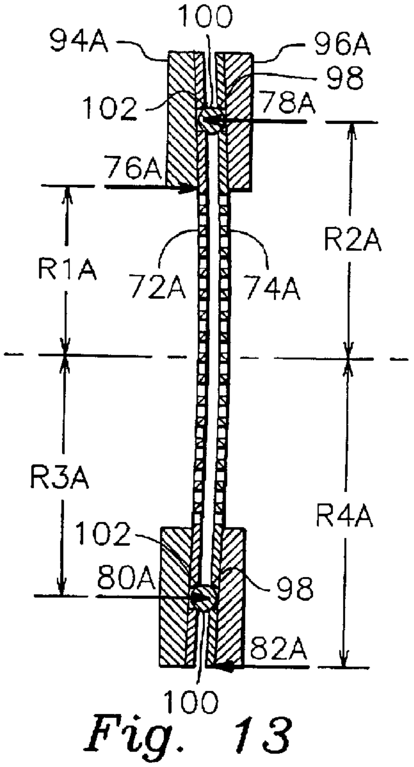
FIG. 13 is a schematic cross-sectional view of the ion optics shown in FIG. 12 along section A—A therein.

Referring to FIG. 12, there is shown ion optics 84A constructed in accordance with an embodiment of the present invention shown more schematically in FIG. 10, but showing additional mechanical details not shown in FIG. 10. Additional details of construction are shown in FIG. 13, which is a schematic cross-sectional view of the ion optics shown in FIG. 12 along section A-A therein. Nuts 86, bolts 88, insulators 90, and washers 92 hold together ion optics 84A in a manner well known to those skilled in the art and described in U.S. Pat. No. 6,246,162, Kahn, et al. In addition to these nuts, bolts, insulators, and washers, the ion optics is comprised of screen grid 72A, accelerator grid 74A, screen support 94A, and accelerator support 96A. It can be seen in FIG. 13 that the surface of screen support 94A in contact with screen 72A approximates an annular section of a cone and that the surface of accelerator support 96A in contact with accelerator grid 74A approximates an annular section of another cone. From a practical viewpoint, the surface of the screen support in contact with the screen grid and the surface of the accelerator support in contact with the accelerator grid could generally be machined as true cones.

Referring to FIG. 13, a first plurality of moments, indicated schematically by forces 76A and 78A applied at the respective radii R1A and R2A, are applied at a plurality of circumferentially distributed locations on the peripheral portion of screen grid 72A. Forces 76A are applied by screen support 94A to one side of screen 72A at radius R1A. Note that, starting with an initially flat screen grid 72A, the first contact between screen grid 72A and screen support 94A will be at the inner radius of that support, which is why radius R1A coincides with the inner radius of screen support 94A. Forces 78A are applied by accelerator support 96A pressing on accelerator grid 74A, which through a plurality of seats 98 formed in accelerator grid 74A presses a matching plurality of ball insulators 100, which in turn presses on another matching plurality of seats 102 formed in screen grid 72A, thereby transmitting the plurality of forces 78A to the other side of screen grid 72A at radius R2A. This first plurality of moments form the peripheral portion of screen grid 72A into the approximate shape of an annular segment of a cone and form the screen grid as a whole into the approximate shape of a segment of a sphere.

Still referring to FIG. 13, a second plurality of moments, indicated schematically by forces 80A and 82A at the respective radii of R3A and R4A, are applied to circumferentially distributed locations on the peripheral portion of accelerator grid 74A. Forces 80A are applied by screen grid support 94A pressing on screen grid 72A, which through a plurality of seats 102 formed in screen grid 72A presses a matching plurality of ball insulators 100, which in turn presses on another matching plurality of seats 98 formed in accelerator grid 74A, thereby transmitting the plurality of forces 80A to one side of accelerator grid 74A at radius R3A. Forces 82A are applied by accelerator support 96A to the other side of accelerator grid 74A at radius R4A. This second plurality of moments form the peripheral portion of accelerator grid 74A into the approximate shape of an annular segment of a cone and form the accelerator grid as a whole into the approximate shape of a segment of a sphere.

Inasmuch as the balls 100 that transmit force 78A to screen grid 72A are the same balls that transmit force 80A to accelerator grid 74A, radius R2A must be equal to radius R3A. Whether or not such equalities exist between the radii used to apply the two pluralities of moments depends on the particular design used and is otherwise not significant.

With the first and second pluralities of moments, grids 72A and 74A, which are initially flat, are formed elastically into matching shallow dished shapes. This elastic deformation during installation again avoids any need for any permanent deformation during fabrication, as well as avoiding the large and unpredictable thermal displacements to which flat grids are prone.

A temperature distribution similar to that shown in FIG. 3 will have an effect on the grids in FIGS. 12 and 13 that differs from that shown in FIG. 6. The thermal displacement of a grid (either screen or accelerator) in FIG. 6 will, for small displacements, be linear with the temperature difference from the center to the edge of the grid. This is because the grid is, except for small flexing stresses, continuously in a stress-free condition and thermal expansion translates directly into thermal displacement. For a grid shown in the configuration of FIGS. 12 and 13, the elastic flexing during installation results in initial tensile and compressive stresses in a grid when it is at uniform temperature. As the center of a grid heats up relative to the edge, there is at first a reduction of these tensile and compressive stresses, as well as a reduction in the magnitude of the moments required to hold the peripheral portion of the grid in contact with its support member (the screen support for the screen grid or the accelerator support for the accelerator grid). During this initial heating, the thermal displacement will be reduced because it will be offsetting initial stresses in the grid. At a sufficiently high temperature difference between the center and edge, approximately at a value where the thermal displacement in a flat grid is equal to the elastic displacement during installation, a further increase in temperature difference will result in a displacement more comparable with that of a grid in FIG. 6.

The spacing between the screen grid 72A and the accelerator grid 74A in FIG. 13 is essentially constant over the portions of those grids with apertures and through which the ions are accelerated. Having a spacing that varies with radius may be of interest for some purpose such as matching the electrostatic acceleration in the ion optics with a radial variation in plasma density, as described in U.S. Pat. No. 3,311,772—Speiser, et al.

The embodiment of the invention in FIGS. 12 and 13 illustrates the invention, but has a maintenance shortcoming. The ions generated in the discharge volume 24 of FIG. 1 are accelerated through the apertures in both the screen grid 36 and accelerator grid 38. There are, however, charge-exchange ions formed near the accelerator grid by energetic ions passing near neutral atoms or molecules. These charge-exchange ions can be attracted to the accelerator grid and cause sputtering of accelerator-grid material therefrom.

A similar charge-exchange and sputtering process occurs for the screen grid 72A and the accelerator grid 74A in FIGS. 12 and 13. When ball insulators 100 are located between screen grid 72A and accelerator grid 74A, some of the sputtered material from accelerator grid 72A can accumulate on the ball insulators 100 and eventually provide a conductive path between the screen grid 72A and the accelerator grid 74A, thereby negating the insulative function of these insulators.

Figure 14:
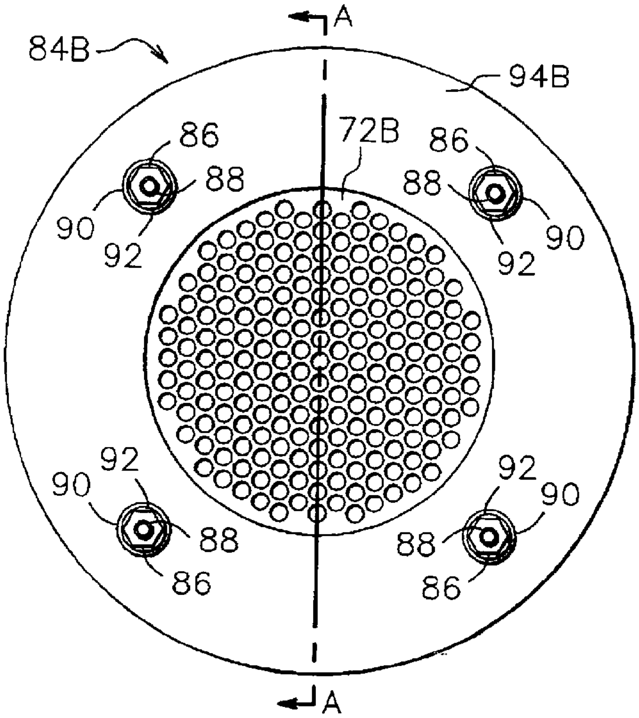
FIG. 14 is another ion optics constructed in accord with another embodiment of the present invention and also having more construction details than the ion optics shown in FIG. 10.
Figure 15:
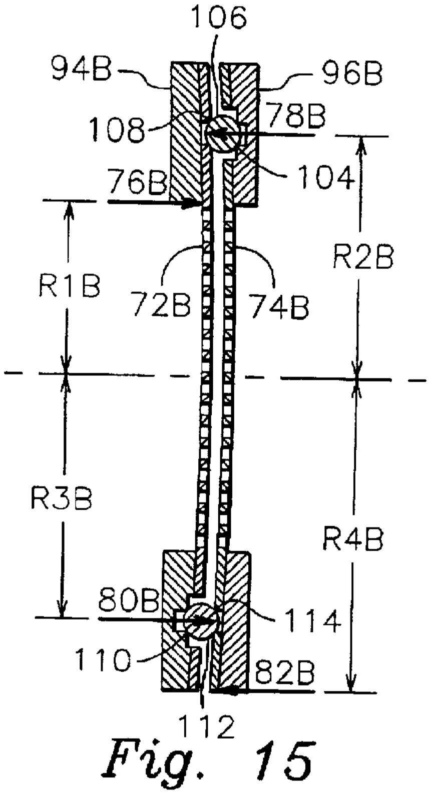
FIG. 15 is a schematic cross-sectional view of the ion optics shown in FIG. 14 along section A—A therein.

Another embodiment of this invention that includes additional details of construction, as well as not having the maintenance shortcoming of the embodiment shown in FIGS. 12 and 13, is shown in FIG. 14 as well as in FIG. 15 which is a schematic cross-sectional view of the ion optics shown in FIG. 14 along section A—A therein. Nuts 86, bolts 88, insulators 90, and washers 92 are again used to hold together ion optics 84B. In addition to these nuts, bolts, insulators, and washers, the ion optics is comprised of screen grid 72B, accelerator grid 74B, screen support 94B, and accelerator support 96B.

Referring to FIG. 15, a first plurality of moments, indicated schematically by forces 76B and 78B applied at the respective radii R1B and R2B, are applied at a plurality of circumferentially distributed locations on the peripheral portion of screen grid 72B. Forces 76B are applied by screen support 94B to one side of screen 72B at radius R1B. Forces 78B are applied by accelerator support 96B, through a plurality of seats 104 formed in accelerator support 96B pressing on a matching plurality of ball insulators 106, which in turn presses on another matching plurality of seats 108 formed in screen grid 72B, thereby transmitting the plurality of forces 78B to the other side of screen grid 72B at radius R2B. This first plurality of moments form the peripheral portion of screen grid 72B into the approximate shape of an annular segment of a cone and form the screen grid as a whole into the approximate shape of a segment of a sphere.

Still referring to FIG. 15, a second plurality of moments, indicated schematically by forces 80B and 82B at the respective radii of R3B and R4B, are applied to circumferentially distributed locations on the peripheral portion of accelerator grid 74*b*. Forces 80B are applied by screen support 94B, through a plurality of seats 110 formed in screen support 94B pressing on a matching plurality of ball insulators 112, which in turn presses on another matching plurality of seats 114 formed in accelerator grid 74B, thereby transmitting the plurality of forces 80B to one side of accelerator grid 74B at radius R3B. Forces 82B are applied by accelerator support 96B to the other side of accelerator grid 74B at radius R4B. This second plurality of moments form the peripheral portion of accelerator grid 74B into the approximate shape of an annular segment of a cone and form the accelerator grid as a whole into the approximate shape of a segment of a sphere.

While the configuration of FIG. 15 is generally similar to that of FIG. 13, it differs in significant details that greatly reduce the need for maintenance. The plurality of insulators 106 that transmit force 78B to screen grid 72B pass through openings in accelerator grid 74B without touching that grid, and are partially recessed into accelerator support 96B. Portions of ball insulators 106 are thus shadow-shielded from sputtered material that passes through the space between screen grid 72B and accelerator grid 74B to reach the ball insulators. In a similar manner, portions of ball insulators 112 are also shadow-shielded from sputtered material. The differences between ion optics 84A shown in FIGS. 12 and 13 and ion optics 84B shown in FIGS. 14 and 15 are thus practical ones that affect the need for maintenance of the ball insulators rather than any material aspect of the subject invention.

Figure 16:
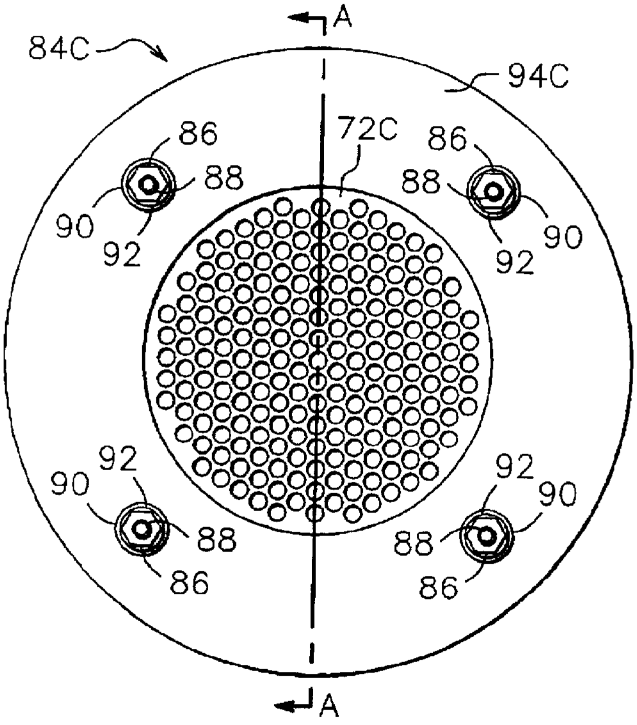
FIG. 16 is yet another ion optics constructed in accord with yet another embodiment of the present invention and again having more construction details than the ion optics shown in FIG. 10.
Figure 17:
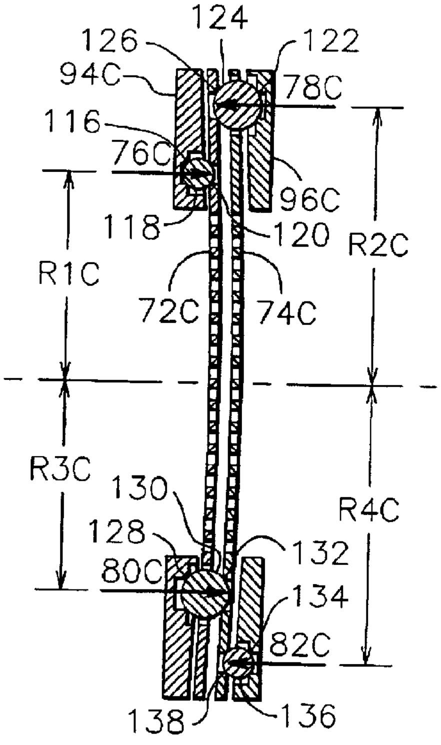
FIG. 17 is a schematic cross-sectional view of the ion optics shown in FIG. 16 along section A—A therein.

Another embodiment of this invention that includes additional details of construction is shown in FIG. 16 as well as in FIG. 17 which is a schematic cross-sectional view of the ion optics shown in FIG. 16 along section A—A therein. In addition to the nuts, bolts, insulators, and washers used to hold together ion optics 84C, the ion optics is comprised of screen grid 72C, accelerator grid 74C, screen support 94C, and accelerator support 96C.

Referring to FIG. 17, a first plurality of moments, indicated schematically by forces 76C and 78C applied at the respective radii R1C and R2C, are applied at a plurality of circumferentially distributed locations on the peripheral portion of screen grid 72C. Forces 76C are applied by screen support 94C to one side of screen 72C at radius R1C through seats 116, ball insulators 118, and seats 120. Forces 78C are applied by accelerator support 96C to the other side of screen grid 72C at radius R2C through seats 122, ball insulators 124 and seats 126. This first plurality of moments form the peripheral portion of screen grid 72C into the approximate shape of an annular segment of a cone and form the screen grid as a whole into the approximate shape of a segment of a sphere.

Still referring to FIG. 17, a second plurality of moments, indicated schematically by forces 80C and 82C at the respective radii of R3C and R4C, are applied to circumferentially distributed locations on the peripheral portion of accelerator grid 74C. Forces 80C are applied by screen support 94C to one side of accelerator grid 74C at radius R3C through seats 128, ball insulators 130 and seats 132. Forces 82C are applied by accelerator support 96C to the other side of accelerator grid 74C at radius R4C through seats 134, ball insulators 136 and seats 138. This second plurality of moments form the peripheral portion of accelerator grid 74C into the approximate shape of an annular segment of a cone and form the accelerator grid as a whole into the approximate shape of a segment of a sphere.

The configuration of FIG. 17 differs from that of FIG. 15 in having the screen grid electrically isolated from the screen support and the accelerator grid electrically isolated from the accelerator support.

Figure 18:
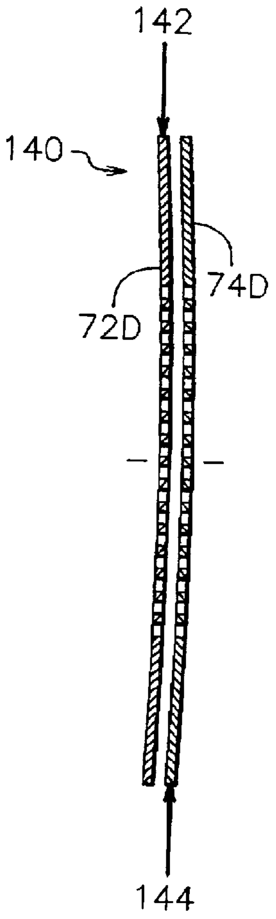
FIG. 18 is a schematic cross-sectional view of yet another embodiment of the present invention.

The embodiments of this invention shown in FIGS. 10 through 17 all use forces approximately normal to the plane of the ion optics to apply moments to the peripheral portions of the grids. It is, of course, possible to use forces at different angles to apply these moments. As an extreme example, a schematic cross-sectional view of ion optics 140 is shown in FIG. 18 wherein only radial forces applied at the outside of the grids are used. Radial forces 142 are applied to screen grid 72D, while radial forces 144 are applied to accelerator grid 74D.

Figure 19A:
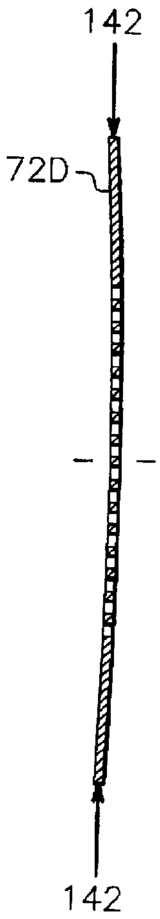
FIG. 19*a* is a schematic cross-sectional view of the screen grid in FIG. 18.
Figure 19B:
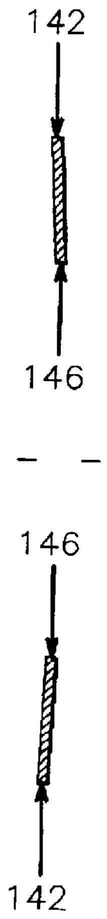
FIG. 19*b* is a free-body diagram of the peripheral portion of the screen grid shown in FIG. 19*a*.

As shown in FIG. 19*a*, radial forces 142 are distributed around the outside edge of screen grid 72D. It may not be clear from FIG. 19*a* that there is a moment applied to the peripheral portion of screen grid 72D. In FIG. 19*b*, using the formalism of statics, a free-body diagram is shown for just the peripheral portion of screen grid 72D. The compressive stresses developed throughout the screen grid 72D result in forces 146 at the inner edge of the peripheral portion. Again using the formalism of statics, because the peripheral portion has no net force on it, forces 146 must be parallel or antiparallel with forces 142. Being parallel or antiparallel and being off set from each other, forces 142 and 146 generate moments that are applied to the peripheral portion of screen grid 72D. The moments in the peripheral portion of the accelerator grid 74D in FIG. 18 are not shown, but are generated in a manner similar to that shown for the grid in FIGS. 19*a* and 19*b*. In starting from flat grids, it is not sufficient to just apply the forces at the outside edges of the grids to achieve the shallow dished shape, it is also necessary to give a small initial displacement to the center portion of each grid to assure that the final displacement is in the correct direction.

The configurations of FIGS. 10 through 19 do not exhaust the possible implementations of the conceptual embodiment of FIG. 10, but they should be illustrative of the possibilities.

SPECIFIC EXAMPLE

The embodiment shown in FIGS. 14 and 15 was fabricated and tested. The screen support 94B and the accelerator support 96B had the same inner diameter of 140 mm and the same outer diameter of 187 mm. The surfaces of the two supports facing the grids were conical, departing from flat by an angle of 2.6 degrees. The mean radius at which the ball insulators holding the screen grid in position were located, R2B, was 88 mm, while the mean radius at which the ball insulators holding the accelerator grid in position were located, R3B, was 79 mm. There were 12 ball insulators at each radius. The screen and accelerator grids were fabricated of molybdenum that was 0.50 mm thick, had an outer diameter of 187 mm, and a close-spaced pattern of 2-mm holes drilled within a diameter of 120 mm. The direction of dishing was as shown in FIG. 15, with the screen grid displaced toward the accelerator grid and the accelerator grid displaced away from the screen grid, giving an approximately uniform grid spacing, L. As assembled, the mean grid spacing was 0.90 mm and varied by less than +0.1 mm over the grid area. The dishing depth (see FIG. 7), H, was only 0.64 mm relative to the inner diameter of the two supports. This gave a relative dishing depth, H/D, over the grid area within the two supports (the usual region for comparing grid dishing) of only 0.0046, well under the relative dishing depth of 0.024 for bistable behavior discussed in connection with FIG. 9.

It was noted that the center part of the grid, within the inner diameter of the supports, was flatter than would be expected from the 2.6° angle of the supports. This was believed due in part to the drilled area of the grid having different elastic characteristics than the solid (undrilled) portion surrounding it.

Figure 20:
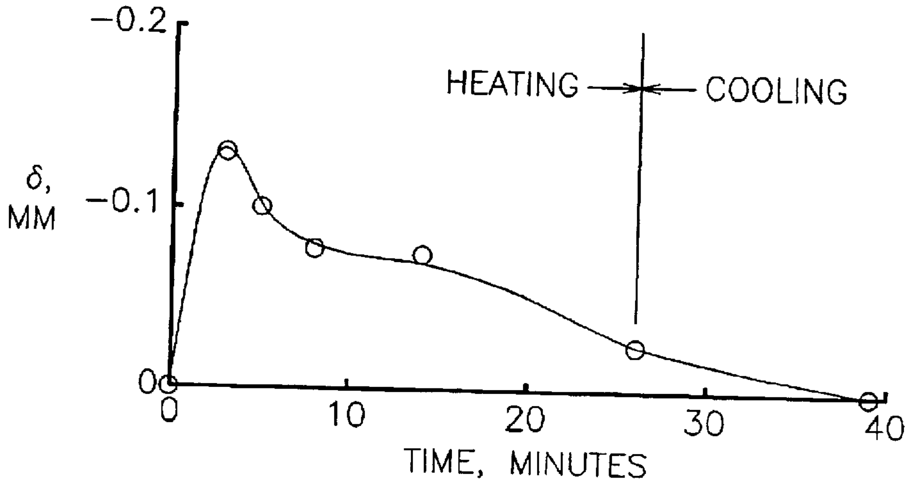
FIG. 20 is a graphical depiction of the change, δ, in grid spacing due to heating of the grids that results from ion source operation, followed by the cooling after that operation ceases. The configuration tested was similar to that shown in FIGS. 14 and 15.

The assembled ion optics were tested on an ion source using a discharge power of 500 W. The variation in grid spacing, $\delta L$, at the center of the ion optics during operation of the ion source is shown in FIG. 20. Starting the discharge and the ion beam extraction at zero time, the spacing decreased (a decrease is indicated by a negative signe for $\delta$) by about 0.13 mm over the first 3 minutes, then slowly returned toward its initial position as the operation was continued, ending up only 0.07 mm smaller than it had started after 26 minutes of operation. After 26 minutes, the discharge was turned off and the ion optics allowed to cool. This resulted in the spacing returning to essentially the initial value after an additional 13 minutes. Disassembly after operation resulted in the grids returning to their initial flat shape, showing that no inelastic deformation had taken place.

The interpretation of the major features of FIG. 20 is straightforward. The discharge initially heats the center of the screen grid by radiation and energetic particle bombardment. The accelerator grid is shadowed by the screen grid and is heated more slowly. The more rapid heating of the screen grid results in the spacing being decreased.

As the operation continues, the screen grid approaches its equilibrium temperature distribution, but the center of the accelerator grid continues to warm up, resulting in the spacing returning toward its initial value.

When the discharge is turned off, the cooling is only by radiation and is therefore slow. The slow cooling results in the two grids having only a small difference between their radial temperature distributions, so that the spacing approaches the initial value quite closely.

To summarize the testing, ion optics incorporating grids with a very shallow dishing depth were demonstrated using an ion optics configuration in which the grids were initially flat and were dished elastically when assembled into the ion optics. The dishing depth was much shallower than has been demonstrated economically using grids that were formed inelastically prior to assembly into the ion optics.

Alternate Embodiments

A variety of additional alternate embodiments are evident to one skilled in the art. Discussion has been focused on molybdenum as a grid material because it is the most common material used for the fabrication of dished grids. Graphite is a brittle material that fractures before any significant inelastic distortion occurs. Because the invention herein can utilize an elastic distortion, graphite is a suitable material for shallow dished grids.

Discussion has also been focused on ion optics that have two grids, a screen grid and an accelerator grid. Ion optics that include a greater number of grids are described in U.S. Pat. No. 6,246,162, Kahn, et al. It should be apparent that an intermediate grid, located between the first and last grids, can be supported in the manner described in connection with FIGS. 16 and 17, with ball insulators supporting it on both sides with the ball insulators in turn supported by more distant structural supports similar to the screen and accelerator supports shown in FIG. 17.

Those skilled in the art will recognize that while spherical insulators are well suited for use in this invention, other insulator shapes such as cylindrical or conical could also be used. In a similar manner, spherical insulators contact seats that are the edges of openings in grids, but indentations in grids could also have been used as the seats for these insulators.

Those skilled in the art will also recognize that while circular apertures are described herein for the acceleration of ions, it is possible and sometimes desirable to use noncircular apertures for this purpose, as described in the aforementioned U.S. Pat. No. 3,311,772—Speiser, et al. While circular grid shapes are also described herein, it is possible and sometimes desirable to use noncircular grid shapes.

While particular embodiments of the present invention have been shown and described, and various alternatives have been suggested, it will be obvious to those of ordinary skill in the art that changes and modifications may be made without departing from the invention in its broadest aspects. Therefore, the aim in the appended claims is to cover all such changes and modifications as fall within the true spirit and scope of that which is patentable.

We claim:

1. Ion optics for use with an ion source comprising:

a first electrically conductive grid having a first plurality of apertures through which ions may pass and also having an integral peripheral portion;

a second electrically conductive grid spaced and electrically isolated from said first grid and having a second plurality of apertures through which ions may pass and also having an integral peripheral portion, wherein said second plurality of apertures are mutually aligned with said first plurality of apertures;

a first plurality of moment means applied to a circumferentially distributed plurality of locations on said peripheral portion of said first grid, thereby establishing by elastic deformation an annular segment of a cone as the approximate shape for said peripheral portion and a segment of a sphere as the approximate dished shape for said first grid as a whole;

a second plurality of moment means applied to a circumferentially distributed plurality of locations on said peripheral portion of said second grid, thereby establishing by elastic deformation an annular segment of a cone as the approximate shape for said peripheral portion and a segment of a sphere as the approximate dished shape for said second grid as a whole; and wherein the relative directions and magnitudes of said first and second pluralities of moments are such that the directions of deformation and the approximate spherical radii are the same for said first and second grids.

2. Ion optics as defined in claim 1 further comprising:

a third electrically conductive grid spaced and electrically isolated from said first and second grids and having a third plurality of apertures through which ions may pass and also having an integral peripheral portion, wherein said third plurality of apertures are mutually aligned with said first and second pluralities of apertures;

a third plurality of moment means applied to a circumferentially distributed plurality of locations on said peripheral portion of said third grid, thereby establishing by elastic deformation an annular segment of a cone as the approximate shape for said peripheral portion and a segment of a sphere as the approximate dished shape for said third grid as a whole; and wherein the relative directions and magnitudes of said first, second and third pluralities of moments are such that the directions of deformation and the approximate spherical radii are the same for said first, second, and third grids.

3. Ion optics as defined in claim 1 further comprising:

at least one additional electrically conductive grid spaced and electrically isolated from said first and second grids and any other additional grids and with each additional grid having an additional plurality of apertures through which ions may pass and also having an additional integral peripheral portion, wherein said additional plurality(ies) of apertures are mutually aligned with said first and second pluralities of apertures;

at least one additional plurality of moment means applied to a circumferentially distributed plurality of locations on said peripheral portion(s) of said additional grid(s), thereby establishing by elastic deformation an annular segment(s) of a cone as the approximate shape(s) for said peripheral portion(s) and a segment(s) of a sphere (s) as the approximate shape(s) for said additional grid(s) as a whole; and wherein the relative directions and magnitudes of said first, second, and additional pluralities of moments are such that the directions of deformation and the approximate spherical radii are the same for said first, second, and additional grids.

4. Ion optics as defined in claim 1, 2, or 3 further comprising:

a support member;

a plurality of insulators; and wherein a first plurality of moment means is applied to said peripheral portion of said first grid by contact with said support member on the first side of said first grid at a first radius from the center of said first grid and by contact with a plurality of insulators on the second side of said first grid at a second radius from the center of said first grid.

5. Ion optics as defined in claim 1, 2, or 3 further comprising:

a first plurality of insulators;

a second plurality of insulators; and wherein a first plurality of moment means is applied to said peripheral portion of said first grid by contact with said first plurality of insulators on the first side of said first grid at a first radius from the center of said first grid and by contact with said second plurality of insulators on the second side of said first grid at a second radius from the center of said first grid.

6. Ion optics as defined in claim 2 further comprising:

a first plurality of insulators;

a second plurality of insulators; and wherein a third plurality of moment means is applied to said peripheral portion of said third grid by contact with said first plurality of insulators on the first side of said third grid at a first radius from the center of said third grid and by contact with said second plurality of insulators on the second side of said third grid at a second radius from the center of said third grid.

7. Ion optics as defined in claim 1, 2, or 3 wherein said grids comprise molybdenum.

8. Ion optics as defined in claim 1, 2 or 3 wherein said grids comprise graphite.

9. A method for electrostatically accelerating ions, the method comprising the steps:

a. providing a first conductive grid means having a substantially flat shape and a first plurality of apertures through which ions may pass and also having an integral peripheral portion;

b. providing a second electrically conductive grid means spaced and electrically isolated from said first grid and having a substantially flat shape and a second plurality of apertures through which ions may pass and also having an integral peripheral portion;

c. mutually aligning said first and second pluralities of apertures;

d. providing a first plurality of moments and applying said moments to said peripheral portion of said first grid, thereby establishing by elastic deformation an annular segment of a cone as the approximate shape of said peripheral portion and a segment of a sphere as the approximate dished shape of said first grid;

e. providing a second plurality of moments and applying said moments to said peripheral portion of said second grid, thereby establishing by elastic deformation an annular segment of a cone as the approximate shape of said peripheral portion and a segment of a sphere as the approximate dished shape of said second grid; and f. selecting the relative directions of said first and second pluralities of moments and adjusting the relative magnitudes of said first and second pluralities of moments so that directions of deformations and the approximate spherical radii are the same for said first and second grids.

10. A method for electrostatically accelerating ions as defined in claim 9, the method comprising the additional steps:

g. providing at least one additional electrically conductive grid means spaced and electrically isolated from said first and second grids and any other additional grids and with each additional grid having a substantially flat shape and an additional plurality of apertures through which ions may pass and also having an integral peripheral portion;

h. mutually aligning said additional plurality(ies) of apertures with said first and second pluralities of apertures;

i. providing an additional plurality of moments for each said additional grid and applying said moments to said peripheral portion of each additional grid, thereby establishing by elastic deformation an annular segment of a cone as the approximate shape of said peripheral portion and a segment of a sphere as the approximate dished shape of said each additional grid as a whole;

j. selecting the direction of each said additional plurality of moments relative to the directions of said first and second moments and adjusting the magnitude of each said plurality of moments relative to the magnitudes of said first and second pluralities of moments so that directions of deformations and the approximate spherical radii are the same for said first, second, and each said additional grids.

* * * * *